Patented Sept. 7, 1948

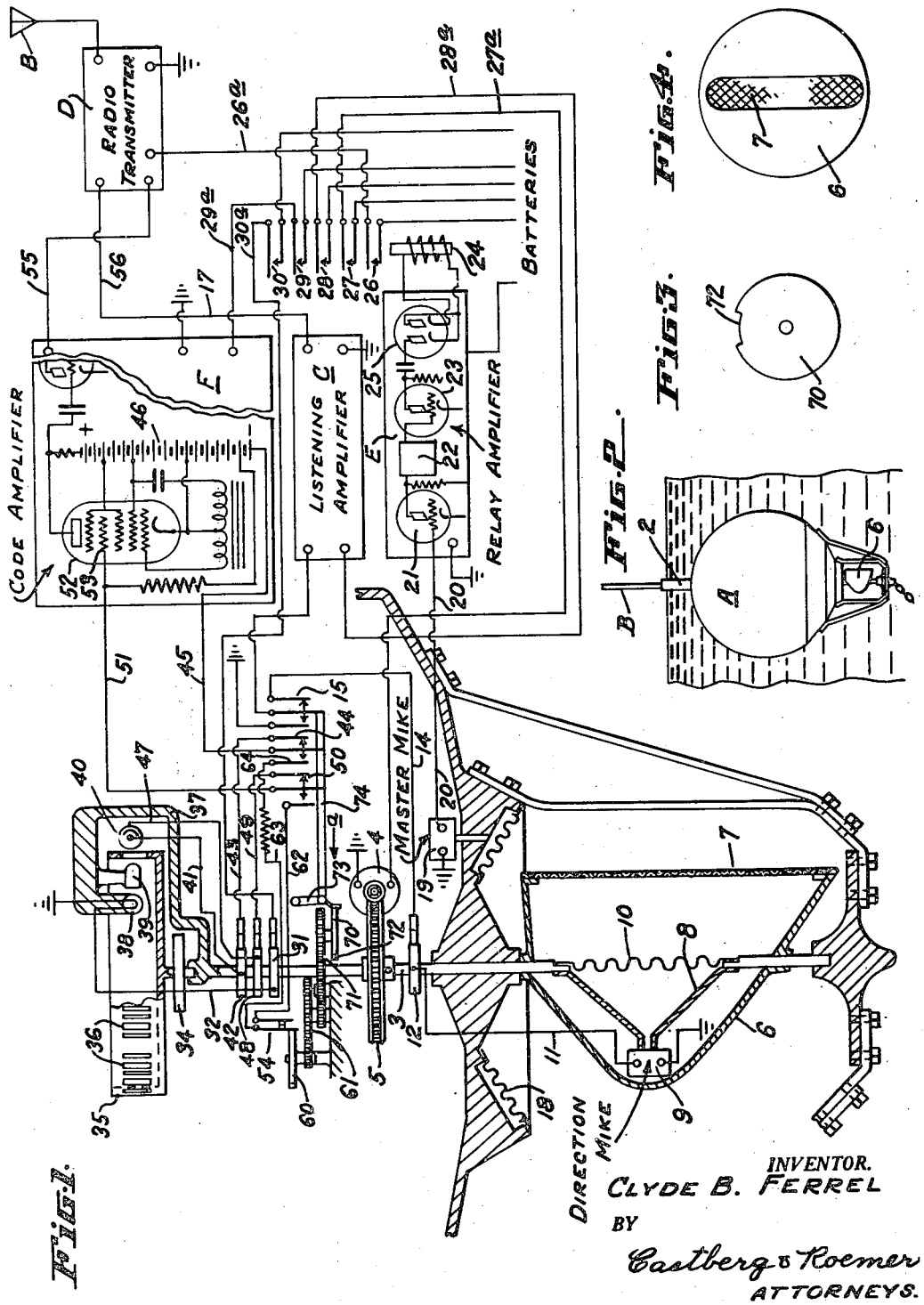

2,448,787

UNITED STATES PATENT OFFICE 2,448,787

APPARATUS FOR DETECTING AND LOCATING ENEMY VESSELS

Clyde B. Ferrel, San Francisco, Calif., assignor to Ferrel Industries, Inc., Reno, Nev., a corporation of Nevada Continuation of application Serial No. 423,994, December 22, 1941. This application August 18, 1944, Serial No. 550,060

34 Claims. (Cl. 177—386)

This application is a continuation of my abandoned application Serial No. 423,994, filed December 22, 1941.

This invention relates to an apparatus for detecting and locating enemy vessels, such as surface vessels of all types and submarines.

The invention, briefly stated, comprises an anchored buoy floating adjacent the surface of the sea or maintained sufficiently submerged to prevent it from being readily detected by the observers of enemy planes or passing vessels. The buoy is provided with a radio transmitter and aerial, with means for broadcasting its position or identification, and in addition, is provided with a rotating sound detector and with means for amplifying and broadcasting the sounds detected and the direction from which they emanate.

Another object of the invention resides in the provision of an apparatus for detecting and locating the presence of enemy vessels operating within a predetermined radius of the apparatus and in which means is provided for detecting and transmitting to distant areas within and beyond said radius the detection of and the line of direction of the enemy vessel with relation to the location of the detecting and transmitting apparatus.

Another object of the invention resides in the provision of an apparatus of the nature stated embodying, among other characteristics, means operatively connected together to broadcast to distant areas the detection of an enemy vessel within a predetermined radius of the apparatus and simultaneously broadcast over one and the same radio transmitter in code signals or otherwise the detection and general line of direction of the enemy vessel with relation to the apparatus and also broadcasting intermittently over the one and same radio transmitter a known identification signal such as to enable receivers at distant areas within and beyond said radius to know from what apparatus the signals are transmitted.

Another object of the invention is to provide a sound detector and direction finder capable of being readily installed and associated with a radio transmission or broadcasting means and which possesses structural characteristics such as to provide for receiving distant sounds for transmission to distant areas and at regular intervals intensifying sounds as received by the detector for intensified action on the radio transmission means.

Another object of the invention resides in the provision of an apparatus for detecting and transmitting sounds from an enemy vessel operating within a predetermined radius of the apparatus and for transmitting intermittently the identity of the apparatus and for transmitting in code in conjunction with a compass and the sound detecting means the line of direction of the enemy vessel with relation to the apparatus.

Another object of the invention is to provide a combined sound detecting and direction finding means for detecting and locating the line of direction of an enemy vessel operating within a predetermined radius of the known location of said combined detecting and direction finding means and by means of a radio transmitting apparatus operatively coupled to the combined device broadcasting the sounds and line of direction of the enemy vessel with relation to the known location of the combined device to distant areas within and beyond the said predetermined radius.

A still further object of the invention resides in the provision of an apparatus to be positioned at a known location and embodying among other characteristics, a radio transmitter and a sound detector operatively connected together, a code signal transmitting mechanism operatively connected with the operative connections between the radio transmitter and the detector, and a device including a detector associated with the apparatus operable to set or start functioning of the apparatus.

It is still a further object of the invention to provide a combined detector and finder for association with a sound broadcasting apparatus and including a rotatable housing having a relatively narrow slot in a side wall thereof and enclosing a sound detector and other elements designed so that as the housing is rotated the said slot sweeps across the line of path between the rotatable detector and the enemy craft to intensify the sounds on the rotatable detector and thereby periodically or intermittently intensify the transmitted sounds derived by the rotatable detector for broadcast from the apparatus.

The invention is shown by way of illustration in the accompanying drawings, in which Fig. 1 is a diagrammatic view showing all the apparatus required for the detection and location of enemy vessels;

Fig. 2 is a side elevation of the buoy, showing it anchored and maintained in a submerged condition with relation to the surface of the water;

Fig. 3 is an enlarged plan view of disc 10; and

Fig. 4 is a front view of the housing containing the sound detector.

Referring to the drawings in detail, and for the purpose of illustrating one embodiment of the invention, A indicates a buoy of suitable construction which will be anchored at a given location. The buoy when anchored may float adjacent the surface or may be sufficiently submerged to prevent it from being readily detected by the observer or enemy planes or passing vessels. Projecting from the upper end of the buoy is a broadcasting aerial B, a portion of which will be coated or enclosed in insulating material such as indicated at 2 to protect the upper exposed portion of the aerial from being grounded by the action of sea water. The exposed portion of the aerial projecting above the sea may be in the form of a thin rod of almost wire-like form, and as such is substantially invisible particularly from overhead planes.

Suitably supported and journalled within the buoy is a shaft 3 which is driven by an electric motor 4 through a reduction gear 5 at a speed, for instance, one R. P. M. The lower end of the shaft extends through the bottom of the buoy and secured to the extending end is a housing 6 enclosing a detector 9 and other elements hereinafter referred to and which will hereinafter be referred to as the direction finder. The housing has a slit-like opening or slot 7 (see Fig. 4), formed therein, covered by a screen to exclude any foreign matter. Behind the screen is a cone 8 on the small end of which is mounted a microphone 9 preferably of the dynamic type and on the large end of the cone is a diaphragm 10 upon which sound waves, passing through the slit-like opening 7, impinge. The microphone is connected through wire 11, a slip-ring 12, and the wire 14, with a switch 15 which in its on position connects the microphone with a listening amplifier generally indicated at C, this being in turn connected through wire 17 with a radio transmitter generally indicated at D and the aerial B.

The direction finder 6, the shaft 3, motor 4 and the listening amplifier are normally at rest to avoid any unnecessary consumption of electric current as a battery supply is all that is provided in the present instance but the necessary circuits are automatically closed when a surface ship or submarine approaches within a predetermined range and this is accomplished as follows:

Suitably mounted on the bottom of the buoy is an annular diaphragm 18 which will hereinafter be referred to as the master diaphragm and actuated thereby is a microphone 19 preferably of the dynamic type which is connected through wire 20 to the first tube 21 of a relay amplifier generally indicated at E. Between the output of this tube and the input of the next tube 23 is placed a band-pass filter 22 whereby no vibrations except those chosen in the design of the filter will be effective for further amplification. When the selected frequency group are present, as, for instance, the propeller beat of a passing submarine or surface ship come within range of the buoy, they will pass through the band-pass filter and will be amplified sufficiently by one or more tubes such as indicated at 23 to cause a relay indicated at 24 to close and remain closed as long as a vessel is within the range of the buoy. The selected frequency group after passing through the band-pass filter and after proper amplification are passed through a rectifier 25 to provide a direct current for the operation of the relay, hence the relay amplifier E is of standard structure throughout except for the employment of the band-pass filter. When the relay closes it closes a multi-throw switch, the individual switches of which are indicated at 26, 27, 28, 29 and 30. One leg of each switch is connected with the batteries not shown. The different parts of the apparatus to which current is supplied when the device as a whole goes into operation are as follows:

Switch 26 supplies current through wire 26a to the radio transmitter.

Switch 27 supplies current through wire 27a to operate the motor 4.

Switch 28 supplies current through wire 28a to operate the listening amplifier C.

Switch 29 supplies current through wire 29a to operate a code-amplifier generally indicated at F which will hereinafter be described, and Switch 30 supplies current through wire 30a, slip-ring 31 and wire 32 to operate an exciter lamp 38 hereinafter to be described.

A code signal transmitting mechanism including in part the compass band or ring 35 having groups of wide and narrow slits 36 and a cooperating arm 37 associated therewith and carrying the exciter lamp 38, lens 39 and the photo-electric cell 40 is mounted on the upper end of the vertical shaft 3 and through suitable instrumentalities the same is operatively coupled with the operative connections between the detector 9 and the radio transmitter D. This code signal transmitting mechanism is connected to the upper end of the rotatable shaft 3 and the rotatable housing 6 carrying the sound detector 9 is connected to the lower end of the shaft 3 below the buoy and below the surface of the water. This code signal transmitting mechanism, including the coupling elements, and the sound detector 9 being coupled together constitute a combined means for detecting and transmitting the line of direction of enemy craft with relation to the broadcasting apparatus.

The code amplifier operates as follows:

Supported by or disposed above the upper end of shaft 3 is a compass, the needle or magnetic bar 34 of which will always point north regardless of any turning of the anchored buoy caused by currents in the sea or otherwise and secured to the magnetic bar in the same manner as a compass card is a band or ring 35 made of a suitable lightweight material such as stiff paper celluloid or the like and formed in the band are a series of wide and narrow slits 36 which are arranged in code formation such as Morse code or any secret code. Secured to the shaft 3 is an arm 37 the outer end of which is U-shaped to extend over the ring. Carried by the U-shaped end of the arm is an exciter lamp 38, lens 39 and a photo-electric cell 40.

When a vessel, whether it be a surface vessel or a submarine, comes within range, sound waves of the selected frequency actuate the master diaphragm 18 and the microphone 19; and the relay amplifier E will accordingly become energized, and the multiple switches actuated thereby will be closed. Five different circuits are closed at this time, to-wit: those indicated by the switches 26, 27, 28, 29 and 30. The circuit through the motor 4 is thus closed and shaft 3 will start to rotate, and as the arm 37 is secured to the shaft, it will start to rotate about the stationary compass card or band 35. The circuit through the exciter lamp was closed by the switch 30, and this lamp will thus send a beam through the lens 39 and this in turn will project the concentrated beam through the slits 36, causing them to impinge on the photo-electric cell 40. The slits, as previously stated, are in the form of narrow and wide slits, and are arranged in groups to indicate the different points of the compass.

The circuit through the photo-electric cell passes through wire 41, a slip ring 42, and wire 43, which is connected with a switch 44. This is closed, and the current will accordingly flow through the opposite leg of the switch, and wire 45 which is connected with the negative side of a battery 46, in the code amplifying circuit F. The other side of the photo-electric cell is connected with a wire 47 which connects with a slip ring 48, and this is connected through wire 49 with one side of a switch 50 which is also closed, and the opposite side of the switch is connected through wire 51, which connects with the grid of a tube generally indicated at 52. This tube forms a portion of the input circuit of the code amplifier. It has, as shown, an oscillator section for producing a fixed or chosen audible tone.

This section is electron coupled and modulates the main control section. The grid 53 of the latter section is maintained at sufficient negative bias to produce plate current cut-off except when current is permitted to flow through the circuit shown by wires 45 and 51, either through the photo-electric cell 40, or a pair of contacts generally indicated at 54. Following the oscillating section of the code amplifier, conventional cascade audio-amplification is employed to modulate with reference to the radio transmitter, the modulated current entering the transmitter through wire 55; in other words, as the exciter lamp 38 and the photo-electric cell aligning therewith, rotate about the compass card or band 35, light impulses in the form of dots and dashes will actuate the photo-electric cell. These in turn will actuate the oscillating circuit just described and the oscillations produced will be amplified to modulate the radio transmitter, which, in turn, broadcasts through the aerial the dots and dashes, and these dots and dashes will indicate the different points of the compass as the arm rotates about the card. At the same time, the sound detector or housing 6 is revolving in unison with the arm 37, and the slit-like opening 7 is pointing in the same direction as arm 37. Hence, as the slit 7 approaches the direction from which the sound originates, the sound comes in more and more loudly, and in passing through the listening amplifier it is amplified and modulated and enters the radio transmitter through wire 56, from which it is broadcast over the aerial B simultaneously with the dots and dashes indicating the points of the compass. Thus a listening station, whether aboard a ship or on shore, will hear the sound, for instance, the propeller beat of a passing ship or submarine, and this sound will fade and strengthen, and reach a maximum once during each revolution of the sound detector or housing 6, and as the compass points are at the same time being heard, the observer at the listening station will know the exact direction of the vessel or submarine with relation to the buoy that is broadcasting.

The listener must also know, however, which buoy is broadcasting, and as it is possible that two or more buoys will be broadcasting at the same time, he must know which buoy or buoys are broadcasting. Hence, it is essential that each buoy broadcast its identification. This may be in the form of one, two. three or more letters of the alphabet, or it may be in the form of code numbers. The identification letters or code of the buoy are contained on the periphery of a disc 60 (see Fig. 1) and will appear in the form of bumps or protrusions, some of which are in the form of round knobs and others bumps of greater length.

These protrusions will, during the rotation of the disc 60, engage one arm of the circuit breaker indicated at 54, and cause it to make and break a circuit in a manner to produce dots and dashes or the like. The disc 60 is continuously driven from shaft 3 through the gear train generally indicated at 61. The circuit made and broken by the circuit breaker 54 may be traced as follows:

One wire 62 connects the circuit breaker with one side of the switch 50, and this switch is normally open. Another wire 63 is connected with the other side of the circuit breaker, and with one contact 64 of switch 44, and this is also normally open. Switch 44 is connected through wire 45 with the negative side of the battery 46, while switch 50 is connected through wire 51 with the grid of tube 52. As this circuit is normally open when the apparatus is in operation, the code or identifying signal of the buoy would not be heard.

In order that it may be heard from time to time, for instance, once during each revolution of shaft 3, a second disc is employed, as indicated at 70. This is driven from shaft 3 through the gears indicated at 71. The disc (see Fig. 3) has a notch or depression 72 formed in its peripheral edge. A pivoted spring arm 73 rides on the smooth outer peripheral edge of the disc 70 during its rotation, but when the notch 72 is encountered, the arm 73 drops into the same and thereby pulls a bar 74 in the direction of arrow a, thereby momentarily closing the circuit through the wires 62 and 51 and 63 and 45. Since the circuit breaker 54 is at all times actuated by the disc 60, it will thus send out the identifying letters of the buoy, and these will be passed through the code amplifier and the wire 55 to the radio transmitter and the aerial and will thus be broadcast, the circuit actuated by the exciter lamp being at that time off, as its circuits have been broken by the movement of the bar 74 in the direction of arrow a. However, the moment arm 73 rides out of the notch 72, the bar moves in a direction opposite to arrow a and the circuits are then closed and the compass will then be broadcast, and the sound will simultaneously be picked up and broadcast.

It is to be understood that numerous buoys of this character will be employed, and that each buoy will be anchored at a specified latitude and longitude. Each buoy will be assigned or given an identifying code number or two or three letters, as above stated, so that when one or more buoys are broadcasting, the listener, whether on ship or shore, will know which buoy or buoys is broadcasting. Various units of the Navy, merchant marine, etc., will be provided with charts showing the location of the different buoys, and the same chart will of course be in the possession of the shore listening stations.

For instance, if a person is stationed at a shore listening station, and hears the buoy whose identifying call is "NB" start to operate, he will listen in and will hear the sound caused by the propeller beat, and the points of the compass indicating the direction from which the sound is coming. During the first revolution the sound may appear to be strongest at the compass point reading northwest, but to check this, the attendant may listen for two or three revolutions to be sure. He will then know that a vessel is within listening range of the buoy "NB" and he will know the direction from the buoy in which the vessel is traveling and he will know the approximate distance, as he will know the listening range of the buoy. This listening range may be, for instance, two or three miles or more.

As the vessel approaches closer to the buoy, the sound will become stronger, and the direction from which the sound comes will obviously be changing. Hence the listener can track the course of the vessels and can also determine the approximate speed.

Again, it is possible that the sound of the same vessel may be picked up by two or more buoys at the same time, and both of these will then broadcast, each buoy giving the direction of the vessel. These directions can be plotted on a chart, and the exact position of the vessel thus known.

It should be quite apparent that, with the information thus received, an excellent check on the location and movements of enemy vessels will be had, both from shore stations and from ships. The means of accomplishing these results are relatively simple. The fundamentals consist of a single motor 4, a radio transmitter D, and two modulating audio-amplifiers. All of these are normally out of operation, and no current is thus consumed. It is only when a submarine or surface vessel enters within the range of one or more buoys that the master diaphragm 18 actuates the microphone 19 and closes the relay. At that time all circuits will be closed, and the identification call of each buoy is broadcast. The sound received is broadcast, and the direction from which the sound is coming is broadcast. Broadcasting will continue until the submarine or surface vessel travels out of the range of the particular buoy or buoys which it is passing at that time; the relay will open, the switches controlled thereby will open, and the current will again be off. The current is, of course, flowing at all times through the relay amplifier E, but small tubes may be employed and the current consumption will be substantially nothing.

It might be mentioned that an expansion circuit could be included in the listening amplifier, whereby the loudness of the submarine or surface vessel sounds heard will be exaggerated at the peak to make it more easy to determine the compass point from which the sounds come.

While a special buoy and one that is preferably hidden has been described, it should be understood that buoys employed for navigation purposes, such as channel and shoal marking buoys, light buoys, etc., may also be employed and may be employed to advantage as enemy vessels might not suspect such buoys of being used for other than navigational purposes.

While this and other features of my invention have been more or less specifically described for purposes of illustration, I nevertheless wish it understood that changes may be resorted to in the construction and arrangement of the various parts, all within the scope of the appended claims, and that the materials and finish may be such as the experience of the manufacturer and varying conditions of use demand.

Having thus described my invention, what I claim and desire to secure by Letters Patent is:

1. An apparatus for detecting and locating vessels, comprising a buoy anchored at a known location, a code amplifier and a listening amplifier both connected with a radio transmitter and all carried by the buoy, a sound detector connected with the listening amplifier, a pair of code transmitters connected with the code amplifier, one of said code transmitters transmitting a code indicating the line of direction of a detected vessel and the other code transmitter transmitting a code whereby a buoy transmitting is identified.

2. An apparatus for detecting and locating vessels, comprising a buoy anchored at a known location, a code amplifier and a listening amplifier both connected with a radio transmitter and all carried by the buoy, a sound detector connected with the listening amplifier, a pair of code transmitters, one transmitting a code indicating the line of direction of a detected vessel and the other code transmitter transmitting a code whereby a buoy transmitting is identified, a master sound detector, and means actuated by said last mentioned detector for automatically closing electric circuits to set all apparatus in operation when sound is detected by said master sound detector and for breaking said circuits when the sound fades out.

3. An apparatus for detecting and locating vessels, comprising a buoy anchored at a known location, a radio transmitter in the buoy, a sound detector, means for amplifying and broadcasting sounds picked up by the sound detector and means for broadcasting the line of direction of a detected vessel, a master sound detector and means actuated by said last mentioned detector for automatically closing electric circuits to set all apparatus in operation when sound is detected by said master sound detector and for breaking said circuits when the sound fades out.

4. An apparatus for detecting and locating vessels, comprising a buoy anchored at a known location, a code amplifier and a listening amplifier both connected with a radio transmitter and all carried by the buoy, a sound detector connected with the listening amplifier, a code transmitter connected with the code amplifier for transmitting signals which indicate all directions, a motor for rotating the sound detector and the code transmitter so that the direction from which a sound emanates may be determined, a master sound detector and means actuated by said master sound detector for automatically closing a circuit through the motor and to supply current to the code transmitter and amplifier, the listening amplifier and the radio transmitter, when sound is detected by the master sound detector and for breaking said circuit and current supply when the sounds fade out.

5. An apparatus for detecting and locating enemy craft operating within a predetermined radius of said apparatus comprising a submerged buoy, a radio transmitter located within the buoy and having an aerial, a rotary motor driven shaft journaled within the buoy and extending through and projecting below the bottom thereof, a direction finder located exteriorly of the buoy at the bottom of the same and carried by the shaft in the rotary movement thereof and comprising a casing having a slot in a side wall thereof, a microphone and a diaphragm located in said casing upon which sound waves passing through said opening impinge, a code signal transmission means mounted at the upper end of the said shaft within the buoy for transmitting signals which indicate all directions, means for connecting the microphone and the code signal transmission means with the radio transmitter for broadcasting said sounds and signals, said direction finder and radio transmitter being normally inoperative, switch mechanism for controlling operation of the direction finder and the code signal transmission means and the radio transmitter, a sound detector mounted on the buoy exteriorly thereof to pick up sounds from enemy craft to operate said switch mechanism, and means actuated by the sound detector for operating the switch mechanism for controlling operation of the direction finder, the code signal mechanism, and the radio transmitter.

6. An apparatus for detecting and locating enemy craft operating within a predetermined radius of said apparatus comprising a submerged buoy, a radio transmitter located within the buoy having an aerial, a vertical rotary motor driven shaft journaled within the buoy and extending through and projecting below the bottom thereof, a direction finder located exteriorly of the buoy at the bottom of the same and carried by said shaft in the rotary movement thereof and comprising a casing having a slot in the front wall thereof, a microphone and a diaphragm upon which sound waves passing through said slot impinge, means for connecting the microphone with the radio transmitter for broadcasting said sounds, and a combined compass and code transmission mechanism supported by the upper end of the shaft and operatively connected with the radio transmitter for transmitting simultaneously with said sound waves code signals for indicating the direction from which said sound waves emanate.

7. An apparatus for detecting and locating enemy craft operating within a predetermined radius of said apparatus comprising a submerged buoy, a radio transmitter located within the buoy, a broadcasting aerial connected with the radio transmitter, a vertical rotary motor driven shaft journaled within the buoy and extending through and projecting below the bottom thereof, a direction finder located exteriorly of the buoy at the bottom of the same and carried by said shaft in the rotary movement thereof and comprising a casing having a slot in the side wall thereof, a microphone and a diaphragm upon which sound waves passing through said slot impinge, means for connecting the microphone with the radio transmitter for broadcasting said sounds, a code transmission mechanism supported by the upper end of the shaft and operatively connected with the radio transmitter and including a stationary compass including a compass card and a band provided with code slits indicating points of the compass, and rotary means carried by the shaft and cooperating with the band of the compass card and arranged in synchronism with the direction finder for transmitting to the radio transmitter code signals indicative of the position of the direction finder with relation to the points of the compass.

8. An apparatus for detecting and locating enemy craft operating within a predetermined radius of said apparatus comprising a submerged buoy, a radio transmitter located within the buoy and having an aerial, a vertical rotary motor driven shaft journaled within the buoy and extending through and projecting below the bottom thereof, a direction finder located exteriorly of the buoy at the bottom of the same and carried by said shaft in the rotary movement thereof and comprising a casing having a slot in the side wall thereof, a microphone and a diaphragm upon which sound waves passing through said slot impinge, means for connecting the microphone with the radio transmitter for broadcasting said sounds, code transmission mechanism supported by the upper end of the shaft and operatively connected with the radio transmitter and including a compass including a stationary compass card or band provided with code slits indicating points of the compass, rotary means carried by the shaft and cooperating with the band of the compass card and arranged in synchronism with the direction finder for transmitting to the radio transmitter code signals indicative of the position of the direction finder with relation to the points of the compass, and means connected with said shaft and actuated by the same for periodically transmitting to the radio transmitter code signals identifying the buoy and provided with means for interrupting the compass code signals while the identification signals are being transmitted.

9. An apparatus for detecting and locating enemy craft operating within a predetermined radius of said apparatus, comprising a buoy anchored at a known location, means for broadcasting sounds emanating from enemy craft including a sound detector and a radio transmitter operatively connected together, the sound detector being arranged exteriorly of the buoy and the radio transmitter being arranged within the buoy and having an aerial extending exteriorly of the buoy, a sound detector carried by the buoy including a diaphragm secured to the buoy exteriorly thereof, and means operated by the diaphragm for controlling the operation of the first named sound detector and the radio transmitter and the operative connections between the same, whereby to broadcast the sounds picked up by the first named detector through the transmitter to areas within and beyond said radius.

10. In an apparatus for detecting and locating an enemy vessel operating within a predetermined radius of said apparatus, the combination of means at a known location for detecting sounds of an enemy vessel operating within said radius comprising a rotatable direction finder device carried by the apparatus below the same and below the level of the water in which the vessel operates including a housing having a slot in a side wall thereof and a sound detector and a diaphragm within the housing in alinement with said slot and operable to pick up sounds from the enemy vessel through said slot, a radio transmitter carried by the buoy and having an aerial, operative connections between the said sound detecting means and the radio transmitter, means carried by said apparatus and operatively connected with said rotatable device to rotate the latter to carry said slot at spaced intervals across the path of direction between the apparatus and the vessel to intensify the sounds as said slot crosses the path of direction between the apparatus and the vessel, and a sound responsive means carried by the apparatus for controlling operation of the rotatable device and its rotatable means and the operative connections between the sound detector and the radio transmitter.

11. In an apparatus for detecting and locating an enemy vessel operating within a predetermined radius of said apparatus, the combination of a buoy, a radio transmitter carried by the buoy and having an aerial, a sound detecting device carried by the buoy and operatively connected to the aforesaid radio transmitter including a rotatable housing depending from the apparatus and having a slot in the side thereof and a detector in the housing in alinement with said slot, means for rotating said housing, whereby to pick up sounds from the enemy vessel within said radius and transmit the sounds to distant points through the radio transmitter, intensifying the sounds detected by the detecting device as the slot in the housing crosses the line of path between the sound detecting device and the enemy vessel, a code signalling device operatively connected with the operative connections between the radio transmitter and the sound detecting device for transmitting signals which indicate all directions, and identifying means carried by the buoy and operatively connected with the aforesaid operative connections with the radio transmitter including a rotatable disc having a notch in the periphery thereof and a pivoted bar having a projection movable into and out of said notch of said disc as the disc rotates for periodically transmitting the buoy identification, and for temporarily discontinuing transmission of the code signals while the apparatus identification signals are being transmitted, and means carried by the buoy for setting the apparatus into detecting and transmitting operations upon entry of an enemy vessel into said predetermined radius and to arrest operations upon departure of an enemy vessel from within said radius.

12. In an apparatus for detecting and locating an enemy vessel operating within a predetermined radius of the apparatus, the combination with a broadcasting radio transmitter and means for operating the same; of means for detecting and locating the direction of an enemy vessel operating within said radius with relation to said apparatus, including a combined code transmission mechanism for transmitting signals which indicate all directions and a compass operatively connected with the radio transmitter and a rotatable housing carried by the apparatus and having a relatively narrow slot in a side wall thereof, a sound detector in the housing in alinement with said slot and operatively connected to the radio transmitter operating means, rotatable means operatively connecting the combined code transmission mechanism and said housing, and means for rotating the housing to rotate said housing slot at intervals across the line of direction between the housing and the enemy vessel.

13. In an apparatus for detecting and locating an enemy vessel within a predetermined radius of the apparatus, a submerged buoy anchored at a known location, a radio transmitter located within the buoy and having an aerial, a listening amplifier located in the buoy and electrically connected with the radio transmitter; a vertical shaft rotatably mounted in the buoy and at its lower end projecting through the bottom of the buoy, an electric motor in the buoy operatively connected with said shaft to rotate the latter, a normally open circuit in the buoy in which said motor is located and including normally open switches, a code signalling mechanism for transmitting signals which indicate all directions located in the buoy and connected with the upper end of the shaft and with the radio transmitter and one of said switches, a sound detector located exteriorly of said buoy and operatively connected to the lower end of said shaft to rotate therewith and having electrical connection with the radio transmitter and with one of said switches, normally inactive means carried by the buoy operable upon operation of an enemy vessel in said radius to close said switches to start the motor and rotate said shaft and said sound detector and actuate said code signalling device and broadcast the detected sound and code signals through the radio transmitter.

14. In an apparatus of the character described for detecting enemy vessels operating within a predetermined radius of the apparatus, the combination with a buoy located at a known location, a radio transmitter carried by the buoy; of a sound detecting means carried by the buoy exteriorly thereof therebelow and below the surface level of the water operatively connected to the radio transmitter and including a housing having a screened slot in a side wall thereof and a detector in the housing in alinement with the said slot, a cone in the housing having its smaller end connected to the housed detector and its larger end directed toward said slot and spaced therefrom, and a diaphragm disposed over the larger end of said cone.

15. In an apparatus of the character described for detecting enemy vessels operating within a predetermined radius of the apparatus, the combination with a buoy located at a known location, a radio transmitter carried by the buoy, a code transmitting mechanism in the buoy operatively connected with the radio transmitter, a compass device in the buoy operatively connected with the code transmitting mechanism and with the radio transmitter and including a magnetic element pointing always to the North and a rotatable arm; of a vertical rotatable shaft to the upper end of which said arm is connected, a sound detecting means carried by the buoy exteriorly thereof therebelow and below the surface level of the water and operatively connected to the compass device through said vertical shaft and to the code transmitting mechanism and with the radio transmitter and including a rotatable housing carried by the lower end of said shaft and operating in unison with said arm of the compass device and having a relatively narrow slot in a side wall thereof and a detector in the housing in alinement with said slot, a cone in the housing having its smaller end connected to the housed detector and its larger end directed toward said slot, a diaphragm secured over the larger end of said cone, means for rotating said shaft and housing upon entry of an enemy vessel within said radius to rotate the slot in the housing across the path of direction between the buoy and the enemy vessel and as the slot crosses said path on each revolution of the housing intensifying the sounds impressed on the housed detector intermittently and thereby broadcast to distant areas presence of the enemy vessel and the line of direction of the enemy vessel with relation to the buoy, and means operatively connected to the radio transmitter to broadcast the identity of the buoy from which the broadcasts emanate.

16. An apparatus for detecting enemy vessels operating within a predetermined radius, comprising a submerged buoy anchored at a known location, a radio transmitter in the buoy, a rotatable sound detector supported by the buoy and arranged exteriorly of the latter below the same and below the surface of the water, electrical connections between the radio transmitter and the rotatable sound detector including a normally open switch, means in the buoy for rotating said sound detector, a second sound detector carried by the buoy operatively connected to said normally open switch to close the latter upon arrival of an enemy vessel into said predetermined radius and thereby set the rotatable sound detector in operation to transmit the enemy vessel sounds to distant areas through the radio transmitter during the presence of the enemy vessel in said predetermined radius and permitting opening of the switch if and when the enemy vessel moves out of said predetermined radius.

17. An apparatus for detecting and locating enemy craft operating within a predetermined radius, comprising a buoy anchored at a known location, a radio transmitter in the buoy having an aerial, a vertical rotatable shaft mounted in the buoy and at its lower end projecting through the bottom of the buoy, a rotatable sound detector and a housing therefor rotatable therewith and carried by the lower projecting end of the shaft, the housing having a relatively narrow slot in the side wall thereof, a code signal transmission means in the buoy including a compass for transmitting signals in code and connected with the upper end of said shaft and including an arm rotatable with the shaft in synchronism with the slot in the detector housing, electrical connections between the code signal transmission means and the radio transmitter including a normally open switch, an electric motor in the buoy operatively connected to said shaft to rotate the latter, listening and amplifying means in the buoy electrically connected with the radio transmitter, a relay amplifier in the buoy including a relay, a second sound detector carried by the buoy and electrically connected to said relay through the relay amplifier to energize the relay and broadcast the line of direction of the enemy craft with relation to the buoy, identification means for the buoy carried by the buoy and actuated by the shaft, means operatively connecting the identification means with the radio transmitter, and means for intermittently broadcasting the buoy identification signals through the radio transmitter and for temporarily arresting transmission of the code signal while transmitting the identification signals.

18. An apparatus for detecting and locating enemy craft operating within a predetermined radius, comprising a buoy submerged at a known location and having an aerial, a normally inactive code transmission mechanism in the buoy operatively connected to the radio transmitter, a compass carried by the buoy and operatively connected to the code transmission mechanism, a normally inactive combined sound detector and direction finder carried by the buoy to detect sounds of enemy craft operating in said radius and transmit sounds, a normally inactive listening amplifier connected with the radio transmitter and the combined sound detector and finder, a normally inactive code amplifier, said normally inactive instrumentalities conserving electrical current while inactive, means for rendering said normally inactive instrumentalities active upon the arrival of enemy craft within said radius comprising a normally inactive electric motor and electrical battery circuits leading to said normally inactive instrumentalities, each battery circuit including a normally open switch and means including a diaphragm operable during the presence of enemy craft operating within said radius to close said battery circuit switches and set said electric motor into operation to broadcast the detected sounds and the code signals to distant areas to advise distant stations of the detection of and the line of direction of the craft with relation to the position of the buoy, buoy identification signalling means carried by the buoy, electrical connections between the identification signalling means and the radio transmitter including a make and break switch and means operable to periodically actuate the latter switch to broadcast the buoy identification signals through the radio transmitter at intervals and for arresting transmission of the code signals during transmission of the buoy identification signals.

19. In an apparatus for detecting and locating enemy craft operating within a predetermined radius of said apparatus, the combination with a buoy anchored at a known location and provided with a radio transmitter, a sound detector, a code transmission mechanism, a code amplifier, and a listening amplifier, all electrically connected together for the transmission of detected sounds and code signals within and beyond said radius and normally inactive; of means for setting said normally inactive instrumentalities into active broadcasting operation, battery circuits in the buoy, each circuit having a normally open switch, a sound detector, a relay and a relay amplifier operatively connected together and to said second named detector and disposed with relation to said switches and operable upon detection by the second mentioned detector of an enemy craft operating within said radius to excite said relay via the relay amplifier and close the respective battery switches and maintain the switches closed as long as an enemy craft operates within said predetermined radius.

20. In an apparatus for detecting and locating enemy craft operating within a predetermined radius of said apparatus, the combination with a buoy anchored at a known location and provided with a radio transmitter, a sound detector including a diaphragm, a code transmission mechanism, a code amplifier, and a listening amplifier, all electrically connected together for the transmission of detected sounds and code signals within and beyond said radius and normally inactive; of means for setting said normally inactive instrumentalities into active broadcasting operation including battery circuits within the buoy, each circuit having a normally open switch, a relay and a relay amplifier interposed between said battery switches and said detector and operable upon fluctuations of said diaphragm to open and close said battery switches.

21. An apparatus for detecting and indicating the location of vessels, comprising a buoy placed at a known location, which buoy includes a main sound detector, an auxiliary direction transmitting sound detector, a signal sending compass indication means, means to send out an identification of the buoy, amplification means associated with each sound detector, electrical circuits connecting the aforesaid main and auxiliary sound detectors with a radio transmitter for broadcasting, the main sound detector being so located that it receives sound from a vessel coming within the detecting radius of the buoy and simultaneously therewith effects operation of the means causing an identification of the buoy to be broadcast and also simultaneously therewith radio broadcasting sounds detected by the auxiliary detector, thereby giving the direction of the vessel relative to the buoy and if the vessel be moving or traveling broadcasting the changing directions of the sound source.

22. An apparatus for detecting and indicating the location and direction of travel of vessels, comprising a buoy placed at a known location, which buoy includes a radio transmitter, a main sound detector, an auxiliary direction sound detector, a signal sending compass indication means, means to send out an identification of the buoy, amplification means associated with each sound detector and the radio transmitter, electrical circuits connecting the sound detectors and amplification means with the radio transmitter for broadcasting, the main sound detector being so located that it receives sound from a vessel coming within the detecting radius of the buoy and the sound is directed to the amplification means and radio transmitter and simultaneously therewith effects operation of the second mentioned means causing an identification of the buoy to be broadcast and also simultaneously therewith broadcasting sounds detected by the auxiliary detector, thereby giving the direction of the vessel relative to the buoy and if the vessel be moving or traveling simultaneously broadcasting the changing directions of the sound source.

23. An apparatus for detecting and indicating the location and direction of travel of vessels comprising a buoy placed at a known location, said buoy including a non-directional sound detector, a directional sound detector and motor means for rotating the directional sound detector to pick up sounds coming from the different directions of the compass, a compass element carried by the buoy and mounted for movement relative thereto, means movable with the directional sound detector for sensing the compass element positions, buoy identification means operable by said directional sound detector rotating means, a radio transmitter, means operated by the non-directional sound detector when it picks up sounds within a predetermined radius from the buoy for activating said radio transmitter and for energizing said motor means to rotate the directional sound detector, the sensing means and the buoy identification means, circuit connections from said directional sound detecting means for modulating the radio transmitter with the sounds received by said directional detecting means, circuit connections from said sensing means for modulating the radio transmitter in accordance with the different positions of the sensing means relative to the compass element, circuit connections for modulating the radio transmitter with the buoy identification means, and means operated by the rotating means for alternately rendering the two latter connections effective for modulating the radio transmitter.

24. An apparatus for detecting and indicating the location and direction of travel of vessels comprising mechanism at a known location, said mechanism including a non-directional sound detector, a directional sound detector and motor means for rotating the directional sound detector to pick up sounds coming from the different directions of the compass, a compass element carried by said mechanism and mounted for movement relative thereto, means movable with the directional sound detector for sensing the compass element positions, identification means for said mechanism operable by said directional sound detector rotating means, a radio transmitter, means operated by the non-directional sound detector when it picks up sounds within a predetermined radius from the said mechanism for activating said radio transmitter and for energizing said motor means to rotate the directional sound detector, the sensing means and the said mechanism identification means, circuit connections from said directional sound detecting means for modulating the radio transmitter with the sounds received by said directional detecting means, circuit connections from said sensing means for modulating the radio transmitter in accordance with the different positions of the sensing means relative to the compass element, circuit connections for modulating the radio transmitter with the said mechanism identification means and means operated by the rotating means for alternately rendering the two latter connections effective for modulating the radio transmitter.

25. An apparatus for detecting and indicating the location and direction of travel of vessels comprising a buoy placed at a known location, said buoy including a non-directional sound detector, a directional sound detector and motor means for rotating the directional sound detector to pick up sounds coming from the different directions of the compass, a compass element carried by the buoy and mounted for movement relative thereto, means movable with the directional sound detector for sensing the compass element positions, buoy identification means operable by said directional sound detector rotating means, a radio transmitter, means operated by the non-directional sound detector when it picks up sounds within a predetermined radius from the buoy for activating said radio transmitter and for energizing said motor means to rotate the directional sound detector, the sensing means and the buoy identification means.

26. An apparatus for detecting and indicating the location and direction of travel of vessels comprising mechanism at a known location, said mechanism including a non-directional sound detector, a directional sound detector and motor means for rotating the directional sound detector to pick up sounds coming from the different directions of the compass, a compass element carried by said mechanism and mounted for movement relative thereto, means movable with the directional sound detector for sensing the compass element positions, identification means for said mechanism operable by said directional sound detector rotating means, a radio transmitter, means operated by the non-directional sound detector when it picks up sounds within a predetermined radius from the said mechanism for activating said radio transmitter and for energizing said motor means to rotate the directional sound detector, the sensing means and the said mechanism identification means.

27. An apparatus for detecting and indicating the location and direction of travel of vessels comprising a buoy placed at a known location, said buoy including a non-directional sound detector, a directional sound detector and motor means for rotating the directional sound detector to pick up sounds coming from the different directions of the compass, a compass element carried by the buoy and mounted for movement relative thereto, means movable with the directional sound detector for sensing the compass element positions, buoy identification means operable by said directional sound detector rotating means, a radio transmitter, means operated by the non-directional sound detector when it picks up sounds within a predetermined radius from the buoy for activating said radio transmitter and for energizing said motor means to rotate the directional sound detector, the sensing means and the buoy identification means, circuit connections from said directional sound detecting means for modulating the radio transmitter with the sounds received by said directional detecting means, circuit connections from said sensing means for modulating the radio transmitter in accordance with the different positions of the sensing means relative to the compass element.

28. An apparatus for detecting and indicating the location and direction of travel of vessels comprising mechanism at a known location, said mechanism including a non-directional sound detector, a directional sound detector and motor means for rotating the directional sound detector to pick up sounds coming from the different directions of the compass, a compass element carried by the said mechanism and mounted for movement relative thereto, means movable with the directional sound detector for sensing the compass element positions, identification means for said mechanism operable by said directional sound detector rotating means, a radio transmitter, means operated by the non-directional sound detector when it picks up sounds within a predetermined radius from the said mechanism for activating said radio transmitter and for energizing said motor means to rotate the directional sound detector, the sensing means and the said mechanism identification means, circuit connections from said directional sound detecting means for modulating the radio transmitter with the sounds received by said directional detecting means, circuit connections from said sensing means for modulating the radio transmitter in accordance with the different positions of the sensing means relative to the compass element.

29. An apparatus for detecting and indicating the location and direction of travel of vessels comprising a buoy placed at a known location, said buoy including a non-directional sound detector, a directional sound detector and motor means for rotating the directional sound detector to pick up sounds coming from the different directions of the compass, a compass element carried by the buoy and mounted for movement relative thereto, means movable with the directional sound detector for sensing the compass element positions, buoy identification means operable by said directional sound detector rotating means, a radio transmitter, means operated by the non-directional sound detector when it picks up sounds within a predetermined radius from the buoy for activating said radio transmitter and for energizing said motor means to rotate the directional sound detector, the sensing means and the buoy identification means, circuit connections from said directional sound detecting means for modulating the radio transmitter with the sounds received by said directional detecting means, circuit connections from said sensing means for modulating the radio transmitter in accordance with the different positions of the sensing means relative to the compass element, circuit connections for modulating the radio transmitter with the buoy identification means.

30. An apparatus for detecting and indicating the location and direction of travel of vessels comprising mechanism at a known location, said mechanism including a non-directional sound detector, a directional sound detector and motor means for rotating the directional sound detector to pick up sounds coming from the different directions of the compass, a compass element carried by said mechanism and mounted for movement relative thereto, means movable with the directional sound detector for sensing the compass element positions, identification means for said mechanism operable by said directional sound detector rotating means, a radio transmitter, means operated by the non-directional sound detector when it picks up sounds within a predetermined radius from the said mechanism for activating said radio transmitter and for energizing said motor means to rotate the directional sound detector, the sensing means and the said mechanism identification means, circuit connections from said directional sound detecting means for modulating the radio transmitter with the sounds received by said directional detecting means, circuit connections from said sensing means for modulating the radio transmitter in accordance with the different positions of the sensing means relative to the compass element, circuit connections for modulating the radio transmitter with the said mechanism identification means.

31. An apparatus for detecting and locating vessels comprising a buoy, a code amplifier and a listening amplifier both connected with a radio transmitter and carried by the buoy, a sound detector connected with the listening amplifier, a pair of code transmitters, one transmitting a code indicating the line of direction of a detected vessel and the other code transmitter transmitting a code whereby a buoy transmitting is identified, a master sound detector, and means actuated by said last mentioned detector for automatically closing electric circuits to set all apparatus in operation when sound is detected by said master sound detector.

32. An apparatus for detecting and locating vessels, comprising a buoy, a radio transmitter in the buoy, a sound detector, means for amplifying and broadcasting sounds picked up by the sound detector and means for broadcasting the course of travel of a detected vessel, a master sound detector and means actuated by said last mentioned detector for automatically closing electric circuits to set all apparatus in operation when sound is detected by said master sound detector.

33. An apparatus for detecting and locating vessels, comprising a buoy, a code amplifier and a listening amplifier both connected with a radio transmitter and carried by the buoy, a sound detector connected with the listening amplifier, a code transmitter connected with the code amplifier for transmitting signals which indicate all directions, a motor for rotating the sound detector and the code transmitter so that the direction from which a sound emanates may be determined, a master sound detector and means actuated thereby for automatically closing a circuit through the motor and to supply current to the code transmitter and amplifier, the listening amplifier and the radio transmitter, when sound is detected by the master detector.

34. An apparatus for detecting and locating vessels operating within a predetermined radius of said apparatus, comprising a buoy at a known location, means for broadcasting sounds emanating from a vessel including a sound detector and a radio transmitter operatively connected together, the sound detector and the radio both carried by the buoy, a master sound detector including a diaphragm also carried by the buoy, and means operated by the diaphragm for controlling the operation of the first named sound detector and the radio transmitter and the operative connections between the same, whereby to broadcast the sounds picked up by the first named detector through the transmitter to areas within and beyond said radius.

CLYDE B. FERREL.

(References on following page)

REFERENCES CITED

The following references are of record in the file of this patent:

UNITED STATES PATENTS

| Number | Name | Date |
|---|---|---|
| 1,308,003 | Ellis | June 24, 1919 |
| 1,426,337 | Sperry | Aug. 15, 1922 |
| 1,610,779 | Hewett | Dec. 14, 1926 |
| 2,177,493 | Koulichkov | Oct. 24, 1939 |
| 2,361,177 | Chilowsky | Oct. 24, 1944 |

FOREIGN PATENTS

| Number | Country | Date |
|---|---|---|
| 335,125 | Italy | Feb. 1, 1936 |
| 596,439 | Germany | May 3, 1934 |